US008320948B2

United States Patent
Li et al.

(10) Patent No.: US 8,320,948 B2
(45) Date of Patent: Nov. 27, 2012

(54) SYSTEM AND METHOD FOR PROBABILITY-BASED RESOURCE ALLOCATION IN A WIRELESS COMMUNICATIONS SYSTEM

(75) Inventors: Dongdong Li, Dallas, TX (US); Dandan Wang, Berkeley Heights, NJ (US); Mazin Al-Shalash, Frisco, TX (US); Anthony C. K. Soong, Plano, TX (US)

(73) Assignee: FutureWei Technologies, Inc., Plano, TX (US)

( * ) Notice: Subject to any disclaimer, the term of this patent is extended or adjusted under 35 U.S.C. 154(b) by 457 days.

(21) Appl. No.: 12/729,101

(22) Filed: Mar. 22, 2010

(65) Prior Publication Data

US 2010/0248769 A1 Sep. 30, 2010

Related U.S. Application Data

(60) Provisional application No. 61/163,384, filed on Mar. 25, 2009.

(51) Int. Cl.
*H04B 17/00* (2006.01)
*H04B 7/00* (2006.01)
*H04W 72/00* (2009.01)

(52) U.S. Cl. ...... 455/509; 455/62; 455/63.1; 455/67.11; 455/454

(58) Field of Classification Search .......... None
See application file for complete search history.

(56) References Cited

U.S. PATENT DOCUMENTS

| 5,655,217 | A | 8/1997 | Lemson |
| 2008/0165880 | A1 | 7/2008 | Hyon et al. |
| 2010/0054352 | A1* | 3/2010 | Huttunen et al. ............ 375/260 |

FOREIGN PATENT DOCUMENTS

| CN | 101026445 A | 8/2007 |
| CN | 101257698 A | 9/2008 |
| CN | 101359930 A | 2/2009 |
| WO | WO 2009/029608 A1 | 3/2009 |

OTHER PUBLICATIONS

European Search Report received in European Application No. 10755439.6-1249, mailed May 21, 2012, 8 pages.
International Search Report received in Patent Cooperation Treaty Application No. PCT/CN2010/071284, mailed Jul. 1, 2010, 5 pages.

(Continued)

*Primary Examiner* — Philip Sobutka
(74) *Attorney, Agent, or Firm* — Slater & Matsil, L.L.P.

(57) ABSTRACT

A system and method for probability-based resource allocation in a wireless communications system is provided. A method for centralized resource allocation includes coordinating spectrum sensing information with a set of cognitive radio (CR) user pairs, computing probability-based information for CR user pairs in the set of CR user pairs, computing adjustment values for each channel available for allocation, assigning a CR user pair to an unassigned channel in a set of channels available for allocation, the assigning based on the probability-based information, updating the adjustment values, repeating the assigning a CR user pair and the updating the adjustment values if the adjustment values have not converged, and transmitting a message to the set of CR user pairs, wherein the message comprises information regarding CR user pair to channel assignments.

22 Claims, 6 Drawing Sheets

OTHER PUBLICATIONS

Marques, Antonio G., et al., "Optimal Stochastic Dual Resource Allocation for Cognitive Radios Based on Quantized CSI," ICASSP 2008, Mar. 31, 2008 pp. 2801-2804.

Written Opinion on the International Search Authority received in Patent Cooperation Treaty Application No. PCT/CN2010/071284, mailed Jul. 1, 2010, 3 pages.

Zhang, Yonghong, et al., "Resource Allocation for Non-Real-Time Services in OFDM-Based Cognitive Radio Systems," IEEE Communications Letters, vol. 13, No. 1, Jan. 2009, pp. 16-18.

"Notice of Proposed Rule Making and Order," Federal Communications Commission, FCC 03-322, Dec. 30, 2003, pp. 1-53.

Attar, A., et al., "Interference-limited resource allocation for cognitive radio in orthogonal frequency-division multiplexing networks," IET Communications, vol. 2, No. 6, 2008, pp. 806-814.

Cabric, D., et al., "Implementation Issues in Spectrum Sensing for Cognitive Radios," IEEE, 2004, pp. 772-776.

Cordeiro, C., et al., "IEEE 802.22: An Introduction to the First Wireless Standard based on Cognitive Radios," Journal of Communications, vol. 1, No. 1, Apr. 2006, pp. 38-47.

Ghasemi, A., et al., "Collaborative Spectrum Sensing for Opportunistic Access in Fading Environments," IEEE, 2005, pp. 131-136.

Ghasemi, A., et al., "Impact of User Collaboration on the Performance of Sensing-Based Opportunistic Spectrum Access," IEEE, 2006, 6 pages.

Haykin, S., "Cognitive Radio: Brain-Empowered Wireless Communications," IEEE Journal on Selected Areas in Communications, vol. 23, No. 2, Feb. 2005, pp. 201-220.

Hoang, A. T., et al., "Maximizing Spectrum Utilization of Cognitive Radio Networks Using Channel Allocation and Power Control," IEEE, 2006, 5 pages.

Hoo, L. M. C., et al., "Multiuser Transmit Optimization for Multicarrier Broadcast Channels: Asymptotic FDMA Capacity Region and Algorithms," IEEE Transactions on Communications, vol. 52, No. 6, Jun. 2004, pp. 922-930.

Huang, J., et al., "Distributed Interference Compensation for Wireless Networks," IEEE Journal on Selected Areas in Communications, vol. 24, No. 5, May 2006, pp. 1074-1084.

Liu, X., et al., "A framework for opportunistic scheduling in wireless networks," Computer Networks, Elsevier, vol. 41, No. 4, 2003, pp. 451-474.

Mitran, P., et al., "Resource Allocation for Downlink Spectrum Sharing in Cognitive Radio Networks," IEEE, 2008, pp. 1-5.

Palomar, D. P., et al., "A Tutorial on Decomposition Methods for Network Utility Maximization," IEEE Journal on Selected Areas in Communications, vol. 24, No. 8, Aug. 2006, pp. 1439-1451.

Seong, K., et al., "Optimal Resource Allocation fo OFDMA Downlink Systems," IEEE, Jul. 9-14, 2006, pp. 1394-1398.

Stolyar, A. L., "Maximizing Queueing Network Utility Subject to Stability: Greedy Primal-Dual Algorithm," Queueing Systems, vol. 50, 2005, pp. 401-457.

Xing, Y., et al., "Dynamic Spectrum Access in Open Spectrum Wireless Networks," IEEE Journal on Selected Areas in Communications, vol. 24, No. 3, Mar. 2006, pp. 626-637.

Yu, W., et al., "Dual Methods for Nonconvex Spectrum Optimization of Multicarrier Systems," IEEE Transactions on Communications, vol. 54, No. 7, Jul. 2006, pp. 1310-1322.

Zhao, Q., et al., "Decentralized Cognitive Mac for Dynamic Spectrum Access," IEEE, 2005, pp. 224-232.

Zhou, X., et al., "Probability-based Transmit Power Control for Dynamic Spectrum Access," IEEE, 2008, pp. 1-5.

Zhou, X., et al., "Probability-based Combination for Cooperative Spectrum Sensing in Cognitive Radio Networks," IEEE, 2009, 5 pages.

* cited by examiner

SYSTEM AND METHOD FOR PROBABILITY-BASED RESOURCE ALLOCATION IN A WIRELESS COMMUNICATIONS SYSTEM

This application claims the benefit of U.S. Provisional Application No. 61/163,384, filed on Mar. 25, 2009, entitled "System and Method for Probability-based Resource Allocation in a Wireless Communications System," which application is hereby incorporated herein by reference.

TECHNICAL FIELD

The present invention relates generally to wireless communications, and more particularly to a system and method for probability-based resource allocation in a wireless communications system.

BACKGROUND

Cognitive Radio (CR) is considered as a type of radio in which communications systems are aware of their environment as well as their internal state and may make decisions about their radio operating behavior based on that information and predefined objectives. A CR system generally consists of a plurality of primary users (PUs), also referred to as licensed users (LUs), and a plurality of secondary users. Examples of PUs may include TV stations or wireless microphones in TV bands. The secondary users are unlicensed CR users and are able to sense the spectrum utilization of the PUs.

In CR systems, a communication can be established when a CR transmitter sends its signal without interfering with PUs, and in the meantime, a CR receiver can decode such signals under certain interference from PUs, in other words, a communication opportunity appears when CR users can transmit legally and receive reliably. CR users can utilize licensed spectrum bands when they do not cause interference to PUs. A time when CR users can transmit without causing interference to the primary users is called a transmission opportunity or a spectrum opportunity. Clearly, the ability to sense the spectrum to detect spectrum opportunities is crucial to CR performance and has been the subject of considerable research.

The basic concept of CR is to allow unlicensed CR users to use licensed spectrum bands (also referred to as licensed frequency bands) as long as they do not cause interference to PUs. Therefore, CR users must be able to identify and use spectrum bands that are not being used by primary users. In practice, the available spectrum bands for CR users may vary with time and location. When a CR user has information to transmit to multiple CR receivers, resources corresponding to transmission opportunities may need to be allocated to the various CR receivers so that the information may be transmitted to the CR receivers while maintaining performance requirements and goals.

SUMMARY

These technical advantages are generally achieved, by embodiments of a system and method for probability-based resource allocation in a wireless communications system.

In accordance with an embodiment, a method for centralized resource allocation is provided. The method includes coordinating spectrum sensing information with a set of cognitive radio (CR) user pairs, computing probability-based information for each CR user pair in the set of CR user pairs, the computing being based on the spectrum sensing information, computing adjustment values for each channel available for allocation, and assigning a CR user pair to an unassigned channel in a set of channels available for allocation, the assigning based on the probability-based information. The method also includes updating the adjustment values, repeating the assigning a CR user pair and the updating the adjustment values if the adjustment values have not converged, and transmitting a message to the set of CR user pairs, wherein the message comprises information regarding CR user pair to channel assignments.

In accordance with another embodiment, a method for resource allocation at a cognitive radio (CR) user is provided. The method includes coordinating spectrum sensing information with a set of CR user pairs, computing probability-based information based on the spectrum sensing information, computing adjustment values for each channel available for allocation, and computing a utility value and a power allocation for each CR user pair based on the probability-based information. The method also includes sharing the utility values with other CR user pairs in the set of CR user pairs, and for each channel I, where I ranges from 1 to a number of channels available for allocation, setting a transmit power for channel I to a first value and updating adjustment values if a utility value associated with the channel I for the CR user is a maximum utility value, and setting the transmit power for channel I to a second value if the utility value associated with the channel I for the CR user is not the maximum utility value. The method further includes updating the adjustment values, repeating the computing a utility value and a power allocation, the sharing the utility values with other CR user pairs, the for each channel I, and the updating the adjustment values if the adjustment values have not converged, and transmitting over channels allocated to the CR user.

In accordance with another embodiment, a communications device is provided. The communications device includes a receiver coupled to an antenna, a transmitter coupled to the antenna, and a processor coupled to the receiver and to the transmitter. The receiver receives signals detected by the antenna; the transmitter transmits signals using the antenna, and the processor senses a state of a spectrum band over which signals are transmitted and received, combines spectrum band state received from neighboring communications devices, computes conditional probabilities based on the spectrum band state, computes and updates multipliers for each channel available for allocation, selects communications device pairs based on a computed power allocation and a utility, and assigns resources to selected communications device pairs.

An advantage of an embodiment is that probability-based resource allocation utilizing cooperative spectrum sensing allows for the allocation of resources to CR users and protecting PUs while consideration for performance requirements, such as quality of service requirements, are considered.

A further advantage of an embodiment is that probability-based resource allocation utilizing cooperative spectrum sensing may be implemented using centralized or distributed techniques, allowing for allocation overhead to be taken into consideration.

The foregoing has outlined rather broadly the features and technical advantages of the present invention in order that the detailed description of the embodiments that follow may be better understood. Additional features and advantages of the embodiments will be described hereinafter which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the embodiments, and the advantages thereof, reference is now made to the following descriptions taken in conjunction with the accompanying drawings, in which:

FIG. 3b is a diagram of a detailed view of a processor and a memory shown in FIG. 3a;

DETAILED DESCRIPTION OF ILLUSTRATIVE EMBODIMENTS

The making and using of the embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The embodiments will be described in a specific context, namely a cognitive radio (CR) system operating in close proximity to a licensed system. The invention may also be applied, however, to other systems wherein a CR system uses directional antennas and/or antenna arrays with beamforming.

Figure 1:
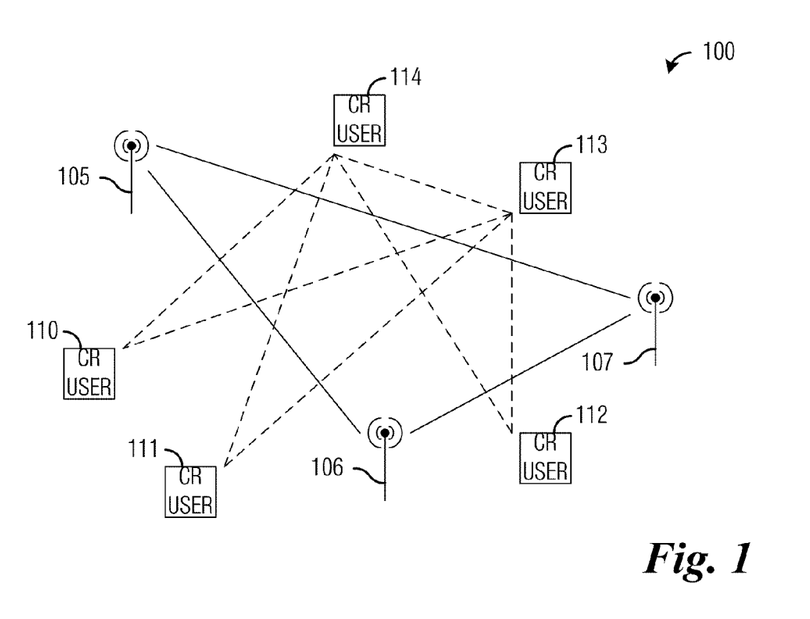
FIG. 1 is a diagram of a CR system.

FIG. 1 illustrates a CR system 100. CR system 100 includes a plurality of primary users (PUs), such as PUs 105 through 107, and a plurality of CR users, such as CR users 110 through 114. The PUs may be licensed users, such as licensed television stations or wireless microphones operating in licensed television bands. The CR users are unlicensed users and are capable of sensing the spectrum utilization of the PUs.

A traditional approach of static spectrum allocation may lead to significant radio spectrum underutilization. With the increasing number of wireless devices and applications, CR technology has been introduced to enable opportunistic spectrum access (OSA). CR users are allowed to utilize a licensed spectrum as long as they do not cause unacceptable interference to PUs. Such a flexible manner may greatly enhance spectrum utilization and has been highlighted by both standards and regulatory bodies.

Due to the existence of the PUs and possible mutual interference between the two classes of users (i.e., the PUs and the CR users), the problem of resource allocation in CR networks is no longer the same as that in traditional networks. Spectrum sensing, which monitors the usage of the licensed spectrum, is thus required to enable the dynamic resource allocation on a non-interfering basis. While fading and shadowing may severely degrade the performance of spectrum sensing, their impact can be mitigated by taking advantage of the spatial diversity with cooperative spectrum sensing in multiuser CR networks. After determining the availability of the licensed spectrum, CR users adjust the transmission parameters, such as transmit power and channel, to achieve certain performance requirements.

Resource allocation in CR networks usually includes channel and power allocation and is based on a multi-channel environment, where the licensed spectrum is divided into several orthogonal frequency channels. One approach is to allocate each channel to one CR user exclusively, while a second approach allows each channel to be shared among multiple CR users.

A focus herein is on the first approach, wherein each channel is allocated to one CR user. In such a situation, the problem of channel and power allocation may be realized as a NP-hard combinational optimization problem.

Figure 2:
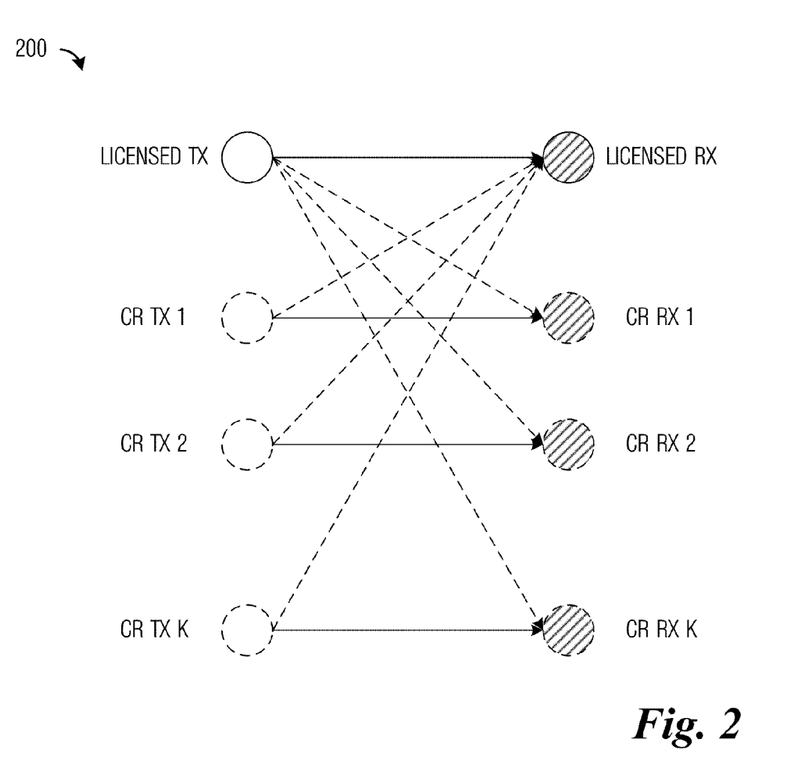
FIG. 2 is a diagram of a portion of a CR system.

FIG. 2 illustrates a portion of a CR system 200. CR system 200 includes K active CR user pairs exploiting communication opportunities in a licensed band of N orthogonal channels, with each orthogonal channel having the same bandwidth of B. Each CR user pair, $U_k$, $1 \leq k \leq K$, consists of one transmitter, $T_k$, and one receiver, $R_k$. OSA is realized by assigning different licensed channels to CR user pairs and allocating transmit power correspondingly, in which there is a need to take the following aspects into account:

The weighted sum rate of the CR networks should be maximized. Weights are placed on the rates of CR user pairs because it is possible that they are given different priorities, e.g., queue-weighted sum rate is used for stability and throughput optimality.

Each channel can be allocated to no more than one CR user pair, which prevents interference among CR links.

Each CR transmitter has a maximum transmit power.

Each licensed receiver has a maximum interference power for sufficient protection of its communication.

Each CR user pair has a minimum transmission rate to guarantee its quality of service (QoS).

Any licensed channel may be either occupied or unoccupied by licensed users. Before resource allocation, spectrum sensing must be done, which involves deciding whether the licensed signal is present or not from the observed signal. Spectrum sensing may be commonly formulated as the following binary hypothesis testing problem, $$y_n(t) = \begin{cases} \tilde{n}_n(t), & H_{n,0} \\ s_n(t) + \tilde{n}_n(t) & H_{n,1}, \end{cases}$$

where $y_n(t)$, $s_n(t)$, and $\tilde{n}_n(t)$ denote the received signal in the n-th channel at the CR user, the received licensed signal, and the additive noise, respectively; $H_{n,0}$ and $H_{n,1}$ denote the hypotheses corresponding to the absence and presence of the licensed signal in the n-th channel, respectively. The goal of spectrum sensing is usually to decide between the two hypotheses, $H_{n,0}$ and $H_{n,1}$, from the observation, $y_n(t)$.

In cooperative spectrum sensing, CR users obtain local information of licensed channel activity and send out the local information through a dedicated control channel. The local sensing information about the n-th channel from the k-th CR user, $u_{k,n}$, may either be a one-bit hard decision on the absence or presence of the signal from the licensed user, or preprocessed sensing data on the k-th CR user's observation.

Specifically, CR user k divides the whole range of its measurement, such as the received signal energy within a predetermined interval, into $L_k$ regions and reports which region its observation falls in. Therefore, $L_k$ is the number of distinct quantized sensing results from CR user k. The $L_k$'s for different CR users are not necessarily the same.

When $L_k=2$, the sensing information from the k-th CR user reduces to a one-bit hard decision on the absence or presence of the licensed signal; when $L_k$ goes to infinity, the sensing information of CR user k becomes its original measurement. Without loss of generality, denote the $L_k$ as possible quantized sensing results of CR user k observed at $t_k$ as $u_k(t_k)=l$ for $l=0, 1, \ldots, L_k-1$. According to the sensing information collected from different CR users, the combining node finally determines the availability of licensed channels.

Figure 3A:
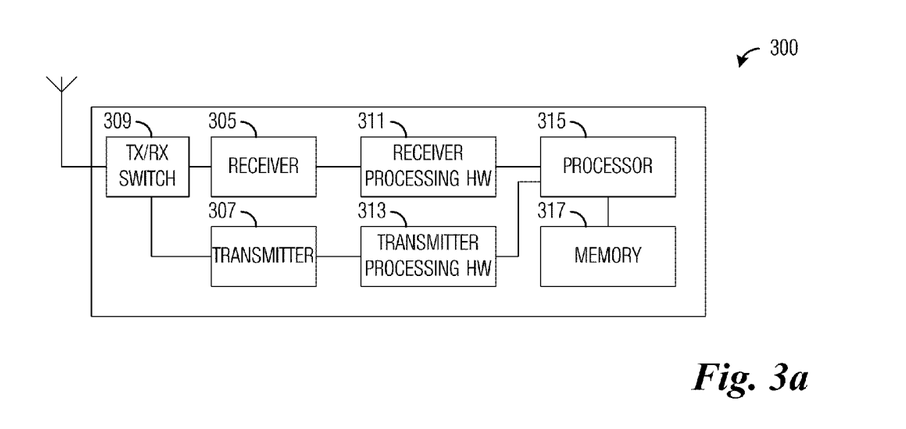
FIG. 3a is a diagram of a CR user.

FIG. 3a illustrates a CR user 300. CR user 300 includes a receiver 305 and a transmitter 307 for use in receiving signals and transmitting signals. Depending on configuration, a transmit/receive (TX/RX) switch 309 may allow for the receiver 305 and the transmitter 307 to share an antenna or antennas. Alternatively, the receiver 305 and the transmitter 307 may have dedicated receive and transmit antennas.

CR user 300 also includes receiver processing hardware 311 that may be used for processing received signals, including filtering, decoding, error detecting and correcting, amplifying, digitizing, mixing, and so forth. CR user 300 also includes transmitter processing hardware 313 that may be used for processing signals to be transmitted, including filtering, encoding, mixing, amplifying, and so on. Output of receiver processing hardware 311, such as data, may be provided to a processor 315. Processor 315 may be used to perform computations using the output of receiver processing hardware 311. A memory 317 may be used to store data, applications, programs, configuration information, and so forth.

Figure 3B:
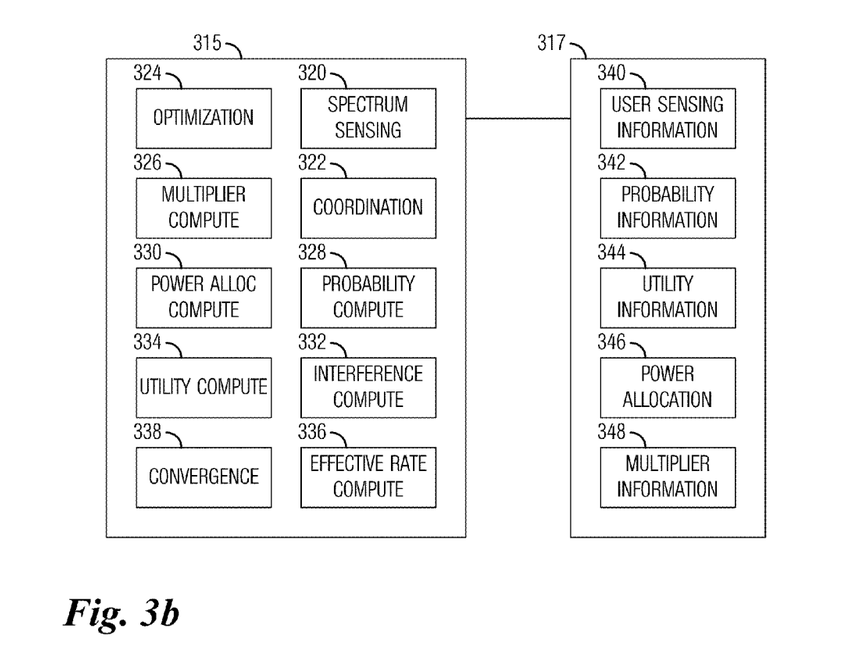

FIG. 3b illustrates a detailed view of processor 315 and memory 317 shown in FIG. 3a. Processor 315 includes a spectrum sensing unit 320, a coordination unit 322, an optimization unit 324, and a multiplier compute unit 326. Spectrum sensing unit 320 may be used to sense a received energy within a specified spectrum band. Then, from the received energy, spectrum sensing unit 320 may determine if a transmission from a PU is taking place, i.e., spectrum sensing unit 320 may determine if the specified spectrum band is occupied. Spectrum sensing unit 320 may sense the received energy by filtering the received signal to help eliminate or reduce signals outside of the specified spectrum band, measure a received energy within the specified spectrum band, accumulate the received energy for a specified amount of time, and then based on the accumulated received energy, decide if a transmission is taking place in the specified spectrum band.

Coordination unit 322 may be used to share results of spectrum sensing unit 320 with other CR users. Coordination unit 322 may transmit the results over dedicated control channels that may be received by other CR users. Alternatively, the results may be provided to a centralized controller that may be responsible for processing the results of spectrum sensing performed by the CR users.

Optimization unit 324 may be used to solve an optimization problem for the CR users, the solution of which may result in an allocation of resources to CR users. The optimization problem may be based on a weighting of a rate for each CR user pair, and each CR user pair's actual data rate. Optimization unit 324 may also select CR user pairs for assignment of allocatable resources. Multiplier compute unit 326 may be used to compute constraints placed on the optimization problem being solved by optimization unit 324. The constraints may be based on maximum transmit power per CR user pair, path loss between a CR transmitter of a CR user pair to a PU, maximum allowable interference power, minimum QoS requirement for each CR user pair, and so forth. A detailed description of the operation of optimization unit 324 and multiplier compute unit 326 is provided below.

Processor 315 also includes a probability compute unit 328, a power allocation unit 330, and an interference compute unit 332. Probability compute unit 328 may be used to compute conditional probabilities that a transmission by a PU is present or absent. Probability compute unit 328 may make use of results of spectrum sensing unit 320 shared between the CR users. Power allocation unit 330 may be used to compute a transmit power level for the CR user pairs. The transmit power level computed by power allocation unit 330 may be based on interference to PUs, path loss, and so on. Interference compute unit 332 may be used to compute interference at a PU due to transmissions from the CR user pairs. The interference may be dependent on factors such as transmit power of the CR user pairs, path loss, and so forth. A detailed description of the operation of probability compute unit 328, power allocation unit 330, and interference compute unit 332 is provided below.

Processor 315 further includes a utility compute unit 334, an effective rate compute unit 336, and a convergence unit 338. Utility compute unit 334 may be used to compute a utility for each CR user pair. The utility may be used in computing a transmit power level for the CR user pairs in power allocation unit 330. Effective rate compute unit 336 may be used to compute an effective rate at a CR receiver of a CR user pair. Convergence unit 338 may be used to determine a convergence of multipliers produced by multiplier compute unit 326. Generally, the multipliers may be deemed to have converged if they do not change significantly per iteration or if a specified number of iterations have been reached. A detailed description of the operation of utility compute unit 334, effective rate compute unit 336, and convergence unit 338 is provided below.

Memory 317 may be used to store information such as user sensing information (user sensing information store 340), both as detected by CR user 300 and received from other CR users through coordination, computed probabilities (probability information store 342), computed utility information (utility information store 344), computed power allocations (power allocation store 346), and multipliers (multiplier information store 348).

Usually, the hard decisions on the availability of licensed channels are used in resource allocation so that only the channels determined to be available by cooperative spectrum sensing will be utilized by CR users. Since there could be decision errors in cooperative spectrum sensing, the use of hard decisions inherits the imprecise information of the hard decision. The inheritance of imprecise information loses the flexibility of OSA and may generate unacceptable interference to licensed users. To improve flexibility and performance, the soft information from cooperative spectrum sensing is used to assist channel and power allocation for all CR users.

For different CR users, the probabilities for the licensed signal to be present or absent in a certain channel could be different. This is because the geographical differences of the CR users relative to the licensed network. All CR users, including transmitters and receivers, are allowed to combine the local sensing information from nearby CR users so that the combined information would be more reliable than local spectrum sensing and also much more accurate than combining information from all users including those far away. Let $\Omega_{T_k,n}$ and $\Omega_{R_k,n}$ denote the set of sensing information about the n-th channel collected by the k-th CR transmitter and receiver, respectively. According to the Bayesian theorem, it is possible to obtain the conditional probability that the licensed signal is present in Channel n at the k-th CR transmitter and absent in Channel n at the k-th CR receiver as $$q_{k,n}^{(B)} = P(H_{n,1} | \Omega_{T_k,n}) = \frac{P(\Omega_{T_k,n} | H_{n,1}) * P(H_{n,1})}{P(\Omega_{T_k,n} | H_{n,1}) * P(H_{n,1}) + P(\Omega_{T_k,n} | H_{n,0}) * P(H_{n,0})}$$

and $$q_{k,n}^{(I)} = P(H_{n,0} | \Omega_{R_k,n}) = \frac{P(\Omega_{R_k,n} | H_{n,0}) * P(H_{n,0})}{P(\Omega_{R_k,n} | H_{n,1}) * P(H_{n,1}) + P(\Omega_{R_k,n} | H_{n,0}) * P(H_{n,0})}$$

respectively, where $P(H_{n,1})$ and $P(H_{n,0})$ are the stable probabilities that the licensed signal is present and absent, and $P(\Omega_{T_k,n}|H_{n,1})$ and $P(\Omega_{R_k,n}|H_{n,1})$ and $P(\Omega_{R_k,n}|H_{n,0})$, are the conditional probabilities that the sensing information is $\Omega_{T_k,n}$, or $\Omega_{R_k,n}$, when the licensed signal is present and absent, respectively. $P(H_{n,1})$ and $P(H_{n,0})$ can be obtained through successive spectrum sensing on the licensed activity; $P(\Omega_{T_k,n}|H_{n,1})$ and $P(\Omega_{T_k,n}|H_{n,0})$, or $P(\Omega_{R_k,n}|H_{n,1})$ and $P(\Omega_{R_k,n}|H_{n,0})$ can be obtained.

To enhance the performance of OSA, probability information of $q_{k,n}^{(B)}$ and $q_{k,n}^{(I)}$ may be used in resource allocation. The sum of $q_{k,n}^{(B)}$ and $q_{k,n}^{(I)}$ does not in general equal to one (1) because different sets of sensing information at the CR transmitter and receiver are used. $q_{k,n}^{(B)}$ will be used for calculating the interference generated at the licensed receiver from the CR transmitter, which is therefore the probability that the licensed signal is present at the CR transmitter; $q_{k,n}^{(I)}$ will be used for calculating the effective rate at the CR receiver, which is therefore the probability that the licensed signal is absent at the CR receiver.

The expected data rate of the k-th user pair in the n-th channel, $r_{k,n}$, is related with the corresponding transmit power, $p_{k,n}$, as $$r_{k,n} = q_{k,n}^{(I)} B \log_2\left(1 + \frac{p_{k,n} g_{k,n}}{N_0 B}\right), \quad (1)$$

where $g_{k,n}$ is the channel gain from the transmitter to the receiver for the k-th user pair in the n-th channel. The noise is Gaussian with power spectral density (PSD) $N_0$.

Let $\rho_{k,n}$ be the allocation indicator that equals 1 when the n-th channel is allocated to the k-th user pair and 0 otherwise, and $w_k$ be the weight for the rate of the k-th user pair. Assumptions include that there is only one licensed user pair, with the case of multiple pairs being discussed in detail below. Then according to the discussion presented previously, the resource allocation among CR users can be formulated as an optimization problem:

$$\max_{\rho,P} \sum_{k=1}^{K} \sum_{n=1}^{N} \rho_{k,n} w_k r_{k,n} \quad (2)$$

subject to $\sum_{k=1}^{K} \rho_{k,n} \leq 1, \forall n, \rho_{k,n} \in \{0, 1\}, \forall k, n$ $$\sum_{n=1}^{N} \rho_{k,n} p_{k,n} \leq \hat{P}_k, \forall k, p_{k,n} \geq 0, \forall k, n$$

$$\sum_{k=1}^{K} q_{k,n}^{(B)} g'_{k,n} \rho_{k,n} p_{k,n} \leq \hat{I}_n, \forall n$$

$$\sum_{n=1}^{N} \rho_{k,n} r_{k,n} \geq \check{R}_k, \forall k,$$

where the target function and constraints include all the aspects in the previous discussion, i.e., to maximize the weighted sum rate with exclusive channel usage and satisfy the maximum power and interference limits as well as the minimum rate requirement. $\hat{P}_k$ is the maximum transmit power for the k-th user pair over all the channels, $g'_{k,n}$ is the path loss from the k-th CR transmitter to the licensed receiver in the n-th channel, $\hat{I}_n$ is the maximum allowable interference power for the licensed system in the n-th channel, and $\check{R}_k$ is the minimum QoS requirement of the k-th CR user pair. Assume that if a licensed signal is present at the CR receiver, $R_k$, the transmission of CR user pair k would fail.

As discussed previously, resource allocation may occur at a centralized controller making use of spectrum sensing information provided by CR users. Alternatively, resource allocation may occur at individual CR users that share spectrum sensing information and computed results. Computing resource allocations at a centralized controller may relieve computational resource requirements at individual CR users since the CR users do not need to solve the optimization problem discussed previously, while distributed computation of resource allocations may alleviate a need for a centralized controller, which may help reduce costs.

In order to make the resource allocation practical, the dual decomposition approach is used herein to form a dual problem of Equation (2) expressible as $$\min_{\lambda_1,\lambda_2,\lambda_3,\lambda_4} \max_{\rho,P} \sum_{k=1}^{K} \sum_{n=1}^{N} \rho_{k,n} w_k r_{k,n} + \quad (3)$$

$$\sum_{n=1}^{N} \lambda_{1,n}\left(1 - \sum_{k=1}^{K} \rho_{k,n}\right) + \sum_{k=1}^{K} \lambda_{2,k}\left(\hat{P}_k - \sum_{n=1}^{N} \rho_{k,n} p_{k,n}\right) +$$

$$\sum_{n=1}^{N} \lambda_{3,n}\left(\hat{I}_n - \sum_{k=1}^{K} q_{k,n}^{(B)} g'_{k,n} \rho_{k,n} p_{k,n}\right) + \sum_{k=1}^{K} \lambda_{4,k}\left(\sum_{n=1}^{N} \rho_{k,n} r_{k,n} - \check{R}_k\right)$$

subject to $\rho_{k,n} \in \{0, 1\}, p_{k,n} \geq 0, \forall k, n$ $\lambda_{1,n} \geq 0, \lambda_{3,n} \geq 0, \forall n$ $\lambda_{2,k} \geq 0, \lambda_{4,k} \geq 0, \forall k,$ where $\lambda_{1,n}, \lambda_{2,k}, \lambda_{3,n}$, and $\lambda_{4,k}$ are introduced Lagrange multipliers.

The problem shown in Equation (3) may further be decomposed into two problems: a lower layer problem and a master problem in an upper layer. In the lower layer, there are K subproblems, expressible as:

$$\max_{\rho,P} \sum_{n=1}^{N} \rho_{k,n} w_k r_{k,n} - \sum_{n=1}^{N} \lambda_{1,n} \rho_{k,n} - \sum_{n=1}^{N} \lambda_{2,k} \rho_{k,n} p_{k,n} - \quad (4)$$

-continued $$\sum_{n=1}^{N} \lambda_{3,n} q_{k,n}^{(B)} g'_{k,n} \rho_{k,n} p_{k,n} + \sum_{n=1}^{N} \lambda_{4,k} \rho_{k,n} r_{k,n} =$$

$$\max_{\rho,P} \sum_{n=1}^{N} \rho_{k,n}((w_k + \lambda_{4,k})r_{k,n} - \lambda_{1,n} - (\lambda_{2,k} + \lambda_{3,n} q_{k,n}^{(B)} g'_{k,n})p_{k,n})$$

subject to $\rho_{k,n} \in \{0, 1\}$, $p_{k,n} \geq 0$, $\forall k, n$.

Let $G_k$ be the maximum value of the objective function in the lower layer problem, the master problem in the upper layer may be expressed as $$\min_{\lambda_1,\lambda_2,\lambda_3,\lambda_4} \sum_{k=1}^{K} G_k + \sum_{n=1}^{N} \lambda_{1,n} + \sum_{k=1}^{K} \lambda_{2,k} \hat{P}_k + \sum_{n=1}^{N} \lambda_{3,n} \hat{I}_n - \sum_{k=1}^{K} \lambda_{4,k} \tilde{R}_k \quad (5)$$

subject to $\lambda_{1,n} \geq 0$, $\lambda_{3,n} \geq 0$, $\forall n$ $\lambda_{2,k} \geq 0$, $\lambda_{4,k} \geq 0$, $\forall k$.

In the lower layer problem, if $\rho_{k,n}=1$, the power allocation can be determined by water-filling $$p_{k,n} = \left[ \frac{(w_k + \lambda_{4,k})q_{k,n}^{(I)} B}{(\lambda_{2,k} + \lambda_{3,n} q_{k,n}^{(B)} g'_{k,n})\ln 2} - \frac{N_0 B}{g_{k,n}} \right]^+, \quad (6)$$

where $\chi_{2,k}$, $\chi_{3,n}$, and $\chi_{4,k}$ are Lagrange multipliers for the channel n at the k-th CR user pair, $w_k$ is a weighting factor for a data rate of the k-th CR user pair, $N_0$ is a noise floor level, B is a bandwidth of a channel n, $q_{k,n}^{(I)}$ is a probability that the licensed signal is absent in a channel n at a k-th CR receiver, $q_{k,n}^{(B)}$ is a probability that a licensed signal is present in a channel n at a k-th CR transmitter, and $g_{k,n}$ is the channel gain from the transmitter to the receiver over channel n at the k-th CR user pair. Define the utility $$u_{k,n} = (w_k + \lambda_{4,k})r_{k,n} - (\lambda_{2,k} + \lambda_{3,n} q_{k,n}^{(B)} g'_{k,n})p_{k,n}. \quad (7)$$

Then for any n, $\rho_{k,n}$ is chosen to be 1 for the largest $u_{k,n}$ and 0 otherwise. Notice that $\lambda_{1,n}$ is omitted in $g_{k,n}$ and is not needed in the optimization. So it can be set arbitrarily and does not need to be updated. Other multipliers can be found using the subgradient method as $$\lambda_{2,k}^{(i+1)} = \left[ \lambda_{2,k}^{(i)} - s_2^{(i)} \left( \hat{P}_k - \sum_{n=1}^{N} p_{k,n} \right) \right]^+, \quad (8)$$

$$\lambda_{3,n}^{(i+1)} = \left[ \lambda_{3,n}^{(i)} - s_3^{(i)} \left( \hat{I}_n - \sum_{k=1}^{K} q_{k,n}^{(B)} g'_{k,n} p_{k,n} \right) \right]^+, \quad (9)$$

$$\lambda_{4,k}^{(i+1)} = \left[ \lambda_{4,k}^{(i)} - s_4^{(i)} \left( \sum_{n=1}^{N} \rho_{k,n} r_{k,n} - \tilde{R}_k \right) \right]^+, \quad (10)$$

where $\lambda_{2,k}^{(i)}$, $\lambda_{3,n}^{(i)}$, and $\lambda_{4,k}^{(i)}$ are small positive step sizes. With appropriate step sizes, the iterations are shown to be convergent.

With the multipliers found, the master problem (Equation (5)) may be solved, thereby providing the resource allocations.

Figure 4:
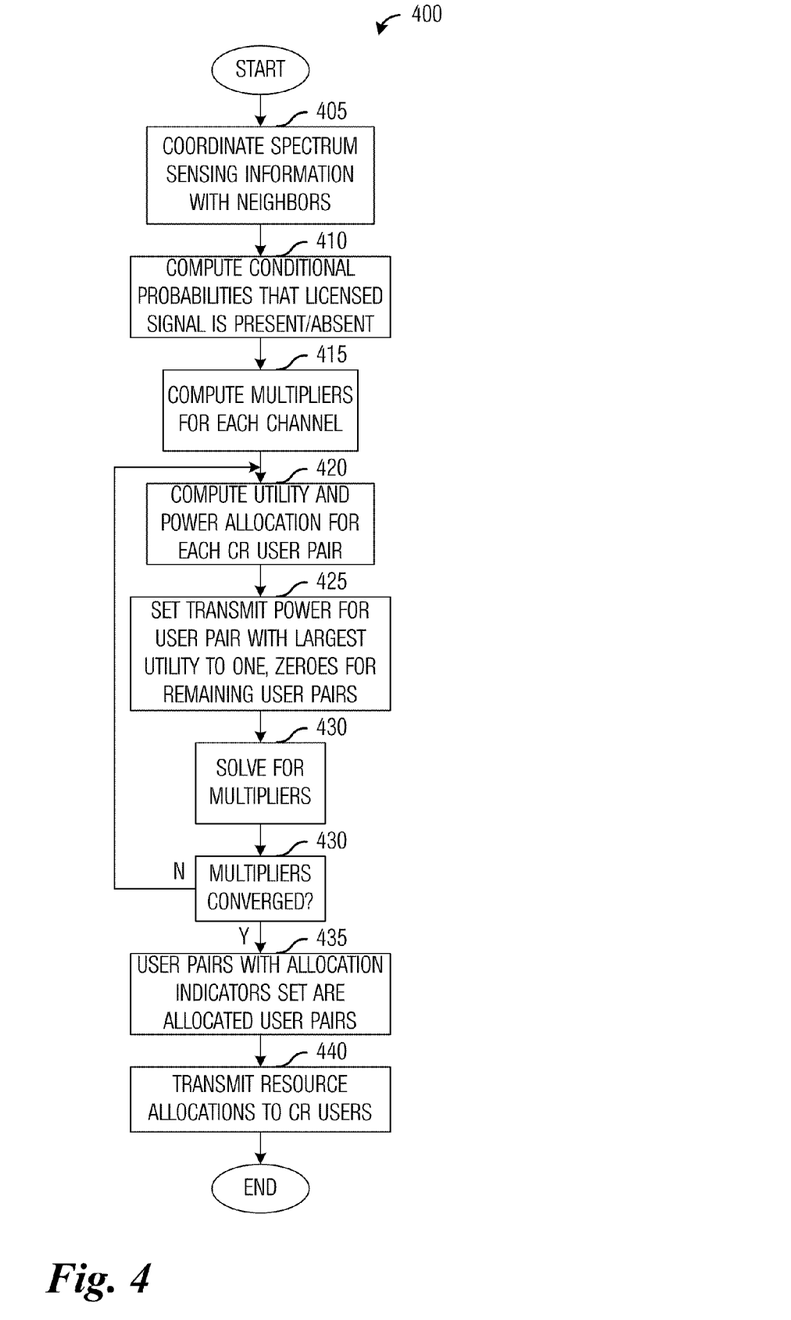
FIG. 4 is a flow diagram of centralized controller operations in resource allocation.

FIG. 4 illustrates a flow diagram of centralized controller operations 400 in resource allocation. Centralized controller operations 400 may be indicative of operations occurring in a centralized controller responsible for computing resource allocations for CR users in a communications system. Centralized controller operations 400 may occur at a centralized controller, which may be a dedicated controller connected to the CR users by a wired or wireless connection. Alternatively, the centralized controller may be a CR user selected to perform the resource allocation for CR users, potentially including itself. Centralized controller operations 400 may occur while the centralized controller is in a normal operating mode and while the CR users have transmissions to transmit.

Centralized controller operations 400 may begin with the centralized controller and the CR users coordinating to share spectrum sensing information (block 405). According to an embodiment, the CR users may transmit results of their spectrum sensing information to the centralized controller. Since the centralized controller may also be a CR user, the centralized controller may have results of its own spectrum sensing operation. Coordinating the centralized controller and the CR users may be performed by coordination unit 322 as shown in FIG. 3b.

Based on the shared spectrum sensing information, the centralized controller may compute probability-based information (e.g., conditional probabilities), such as conditional probabilities that a licensed signal (i.e., a protected signal) is present in channel n at a k-th CR transmitter ($q_{k,n}^{(B)}$) and absent in channel n at the k-th CR receiver ($q_{k,n}^{(I)}$) (block 410). The conditional probabilities may be expressible as:

$$q_{k,n}^{(B)} = P(H_{n,1} \mid \Omega_{T_k,n})$$

$$= \frac{P(\Omega_{T_k,n} \mid H_{n,1}) * P(H_{n,1})}{P(\Omega_{T_k,n} \mid H_{n,1}) * P(H_{n,1}) + P(\Omega_{T_k,n} \mid H_{n,0}) * P(H_{n,0})}$$

and $$q_{k,n}^{(I)} = P(H_{n,0} \mid \Omega_{R_k,n})$$

$$= \frac{P(\Omega_{R_k,n} \mid H_{n,0}) * P(H_{n,0})}{P(\Omega_{R_k,n} \mid H_{n,1}) * P(H_{n,1}) + P(\Omega_{R_k,n} \mid H_{n,0}) * P(H_{n,0})},$$

where $\Omega_{T_k,n}$ and $\Omega_{R_k,n}$ denote the set of sensing information about the n-th channel collected by the k-th CR transmitter and receiver, respectively, and $H_{n,0}$ and $H_{n,1}$ denote the hypotheses corresponding to the absence and presence of the licensed signal in the n-th channel, respectively. The computing of the conditional probabilities may be performed by probability compute unit 328 of processor 315.

The centralized controller may also initiate the computing of Lagrange multipliers for each channel (block 415). According to an embodiment, the centralized controller may initiate the computing of Lagrange multipliers $\lambda_{2,k}^{(1)}$, $\lambda_{3,n}^{(1)}$, and $\lambda_{4,k}^{(1)}$ for each channel n, $1 \leq n \leq N$, where only $\lambda_{3,n}^{(1)}$ should be the same for all user pairs. Multiplier compute unit 326 may be used to compute the Lagrange multipliers.

The centralized controller may also compute, for each CR user pair, a power allocation ($p_{k,n}$) and a utility ($u_{k,n}$) (block 420). According to an embodiment, Equation (6) may be used to compute the power allocation and Equation (7) may be used to compute the utility. Power allocation compute unit 330 and utility compute unit 334 may be used to compute the power allocation and the utility, respectively.

The centralized controller may then find a CR user pair with a highest utility and set the transmit power for the CR user pair to one (block 425). Furthermore, all other CR user pairs will have their transmit power for the selected channel n set to zero. According to an embodiment, when multiple CR user pairs have the same or substantially the same utility value, the centralized controller may randomly select one of the multiple CR user pairs as the CR user pair with the highest utility and set the transmit power for the selected CR user pair to one.

The centralized controller may solve for the Lagrange multipliers (block 430). According to an embodiment, the Lagrange multipliers may be solved using Equations (8)-(10). $\lambda_{1,n}$ is omitted in $g_{k,n}$ and is not needed in the optimization. So it can be set arbitrarily and does not need to be updated. The centralized controller may then check to determine if the Lagrange multipliers have converged (block 435). According to an embodiment, the Lagrange multipliers may be deemed to have converged if successful Lagrange multiplier values change by less than a threshold or if a specified number of iterations have been met. Solving the Lagrange multipliers may be performed by multiplier compute unit 326 of processor 315.

If the Lagrange multipliers have not converged, then the centralized controller may return to block 420 to perform another iteration of resource allocation optimization. If the Lagrange multipliers have converged, then the resource allocation optimization may be complete and CR user pairs with allocation indicators ($\rho_{k,n}$) equal to one are the CR user pairs with allocated resources (block 440). The centralized controller may send messages to the CR users with resource allocations (block 445) and centralized controller operations 400 may then terminate.

Although the optimization problem shown in Equation (2) may be non-convex in nature, a duality gap may converge to zero for sufficiently large values of N (a number of iterations). Therefore, a globally optimal resource allocation in the communications system may be achieved.

Figure 5:
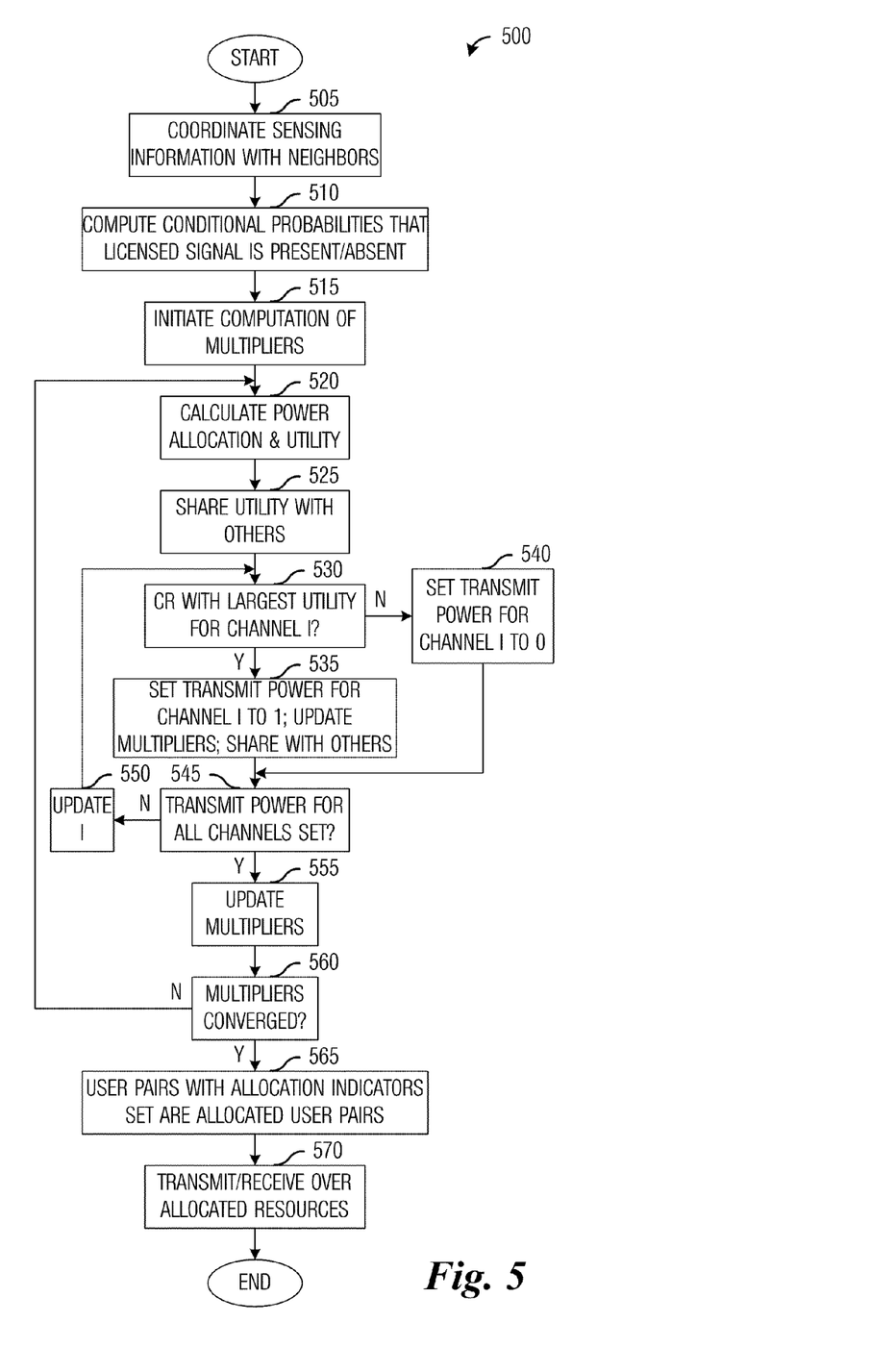
FIG. 5 is a flow diagram of CR user operations distributed resource allocation.

FIG. 5 illustrates a flow diagram of CR user operations 500 distributed resource allocation. CR user operations 500 may be indicative of operations occurring in a CR user that is part of a communications system with a number of CR users. CR user operations 500 may occur at each of the CR users in the communications system while the CR user is in a normal operating mode and has transmissions to transmit.

CR user operations 500 may begin with the CR user coordinating results of its spectrum sensing operation with other CR users (block 505). The CR user may share the results of its spectrum sensing operation with other CR users while receiving results of other CR users spectrum sensing operations. Coordinating spectrum sensing operation results may occur at periodic intervals.

Based on the shared spectrum sensing information, the CR user may compute probability-based information (e.g., conditional probabilities), such as conditional probabilities that a licensed signal (i.e., a protected signal) is present in channel n at a k-th CR transmitter ($q_{k,n}^{(B)}$) and absent in channel n at the k-th CR receiver ($q_{k,n}^{(I)}$) (block 510). The conditional probabilities may be expressible as:

$$q_{k,n}^{(B)} = P(H_{n,1} \mid \Omega_{T_k,n})$$
$$= \frac{P(\Omega_{T_k,n} \mid H_{n,1}) * P(H_{n,1})}{P(\Omega_{T_k,n} \mid H_{n,1}) * P(H_{n,1}) + P(\Omega_{T_k,n} \mid H_{n,0}) * P(H_{n,0})}$$

and

-continued $$q_{k,n}^{(I)} = P(H_{n,0} \mid \Omega_{R_k,n})$$
$$= \frac{P(\Omega_{R_k,n} \mid H_{n,0}) * P(H_{n,0})}{P(\Omega_{R_k,n} \mid H_{n,1}) * P(H_{n,1}) + P(\Omega_{R_k,n} \mid H_{n,0}) * P(H_{n,0})},$$

where $\Omega_{T_k,n}$ and $\Omega_{R_k,n}$ denote the set of sensing information about the n-th channel collected by the k-th CR transmitter and receiver, respectively, and $H_{n,0}$ and $H_{n,1}$ denote the hypotheses corresponding to the absence and presence of the licensed signal in the n-th channel, respectively.

The CR user may initiate a computing of the Lagrange multipliers $\lambda_{2,k}^{(1)}$, $\lambda_{3,k}^{(1)}$, and $\lambda_{4,k}^{(1)}$ for each channel n, $1 \leq n \leq N$ (block 515). Only Lagrange multiplier $\lambda_{3,n}^{(1)}$ may be the same for all CR user pairs. The CR user may also calculate power allocation ($p_{k,n}$) and a utility ($u_{k,n}$) for each channel n, $1 \leq n \leq N$ (block 520). According to an embodiment, Equation (6) may be used to compute the power allocation and Equation (7) may be used to compute the utility. The CR user may share the utility with the other CR users by transmitting messages to the other CR users (block 525).

Based on its own computed utility values for each channel and utilities received from the other CR users, the CR user may check to determine if it has the largest utility value for a channel I, where I is an index variable ranging in value from 1 to n (block 530). If the CR user has the largest utility value for channel I, then the CR user may set its transmit power for channel I to one, update the Lagrange multipliers, and share with the other CR users that it is the CR user with the largest utility value for channel I and that the other CR users should set their transmit power to zero for channel I (block 535). If the utility of the CR user for channel I is not the largest, then the CR user may set the transmit power for channel I to zero (block 540)

The CR user may then check to determine if the transmit power has been set for all n channels (block 545). If the transmit power for all n channels has not been set, then the CR user may update the index variable I (block 550) and return to block 530 to set the transmit power for the channel I.

Once the transmit power for all n channels have been set (block 545), then the CR user may update the Lagrange multipliers (block 555). According to an embodiment, the CR user updates Lagrange multipliers $\lambda_{2,k}^{(1)}$ and $\lambda_{4,k}^{(1)}$ according to Equation (8) and Equation (10) for each channel n, $1 \leq n \leq N$.

The CR user may then check to determine if the Lagrange multipliers have converged (block 560). According to an embodiment, the Lagrange multipliers may be deemed to have converged if successful Lagrange multiplier values change by less than a threshold or if a specified number of iterations have been met. If the Lagrange multipliers have not converged, then the CR user may return to block 520 to perform another iteration of resource allocation optimization. If the Lagrange multipliers have converged, then the resource allocation optimization may be complete and CR user pairs with allocation indicators ($\rho_{k,n}$) equal to one are the CR user pairs with allocated resources (block 565). The CR user may transmit to CR users with allocated resources (block 570) and CR user operations 500 may then terminate.

The CR users do not need to exchange most of the local information during resource allocation optimization except the utility ($u_{k,n}$) and the interference information involved in Lagrange multiplier $\lambda_{3,n}^{(1)}$, both of which are necessary since the former is needed when selecting a CR user pair for the communication within a certain channel and the later is needed to make sure the aggregated interference from CR communication is within the tolerance level of the PU.

Channel information from the PU to the CR users may be obtained through successive spectrum sensing operations. Since the CR users acquire the received signal strength within the licensed channel during spectrum sensing operations, they may be able to estimate the channel as long as they have certain prior knowledge of the transmitted licensed signal strength.

An assumption is made that one PU pair exists so that there is only one inequality as a bound for the interference in Equation (3). If there are more PUs, additional inequalities may be added in the optimization problem and the solution may still be obtained with the techniques described above.

If the activity of the PUs appears and disappears frequently, it may be possible that the licensed channel state may change during a CR user communication. In this case, the whole frame length of the CR user communication may be divided into several parts (e.g., time slots) and associate different $q_{k,n}^{(B)}$ and $q_{k,n}^{(I)}$ for each part according to the acquired licensed activity statistics. Then the resource allocation techniques as described above may be applied for each part.

Evaluation of the resource allocation techniques discussed above was performed with four CR user pairs and 16 channels each with a bandwidth of 100 KHz. The weights between different users are assumed to be [1 1 2 2] and the minimum rate requirements are [100 200 200 400] Kbps, respectively. The channel between a CR transmitter and a CR receiver, and between a licensed transmitter and a licensed receiver are assumed to be independent and identically Rayleigh distributed with means equal to one. Both the transmit power constraints for each user pair and the interference constraints for each channel are the same. The resource allocation techniques discussed previously are compared with a conventional resource allocation technique not based on probabilities, i.e., only hard cooperative spectrum sensing decisions are used.

Figure 6:
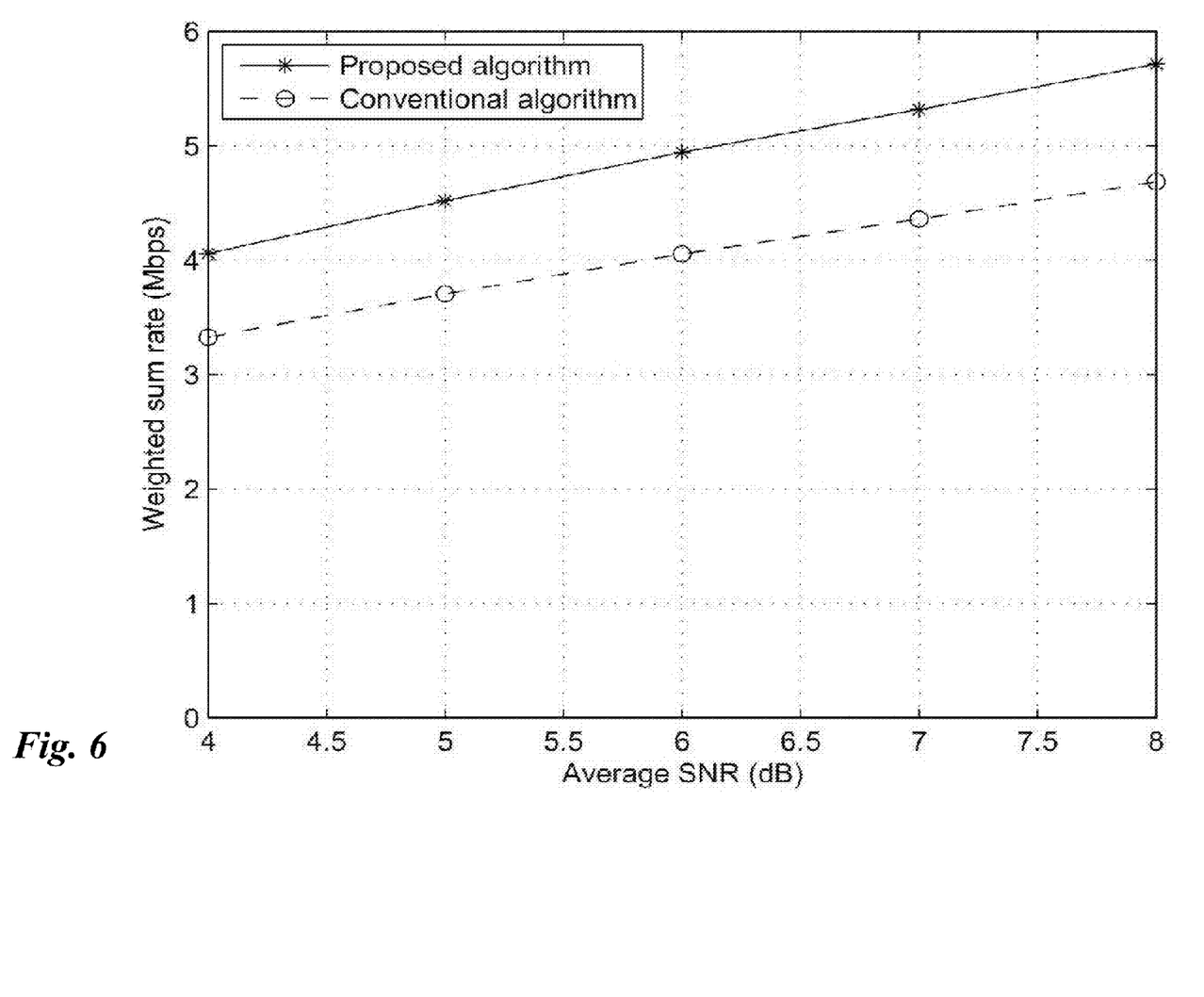
FIG. 6 is a plot of the weighted sum data rates with respect to different average signal-to-noise ratios (SNRs)

FIG. 6 illustrates a plot of the weighted sum data rates with respect to different average signal-to-noise ratios (SNRs). The interference constraint is set to be 0.001 W and the transmit power constraint is set to be 0.1 W. For all average SNRs, the probability-based resource allocation techniques discussed above achieve better performance in terms of weighted sum data rate. This is because the conventional resource allocation technique uses the hard decision of the cooperative spectrum sensing which inherits decision errors that would result in the fail of CR communication.

Figure 7:
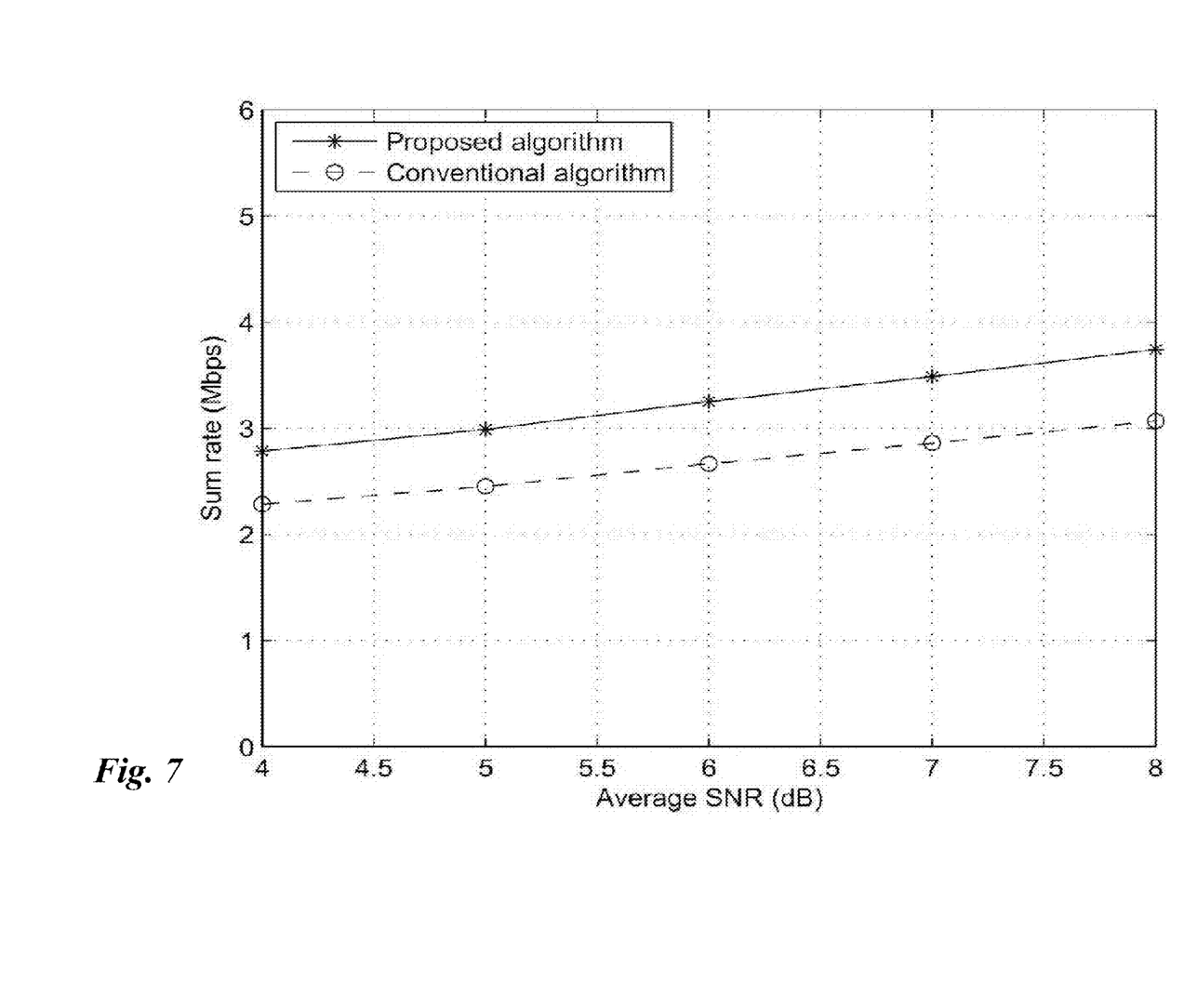
FIG. 7 is a plot of the sum data rates with respect to different maximum interference power for several resource allocation techniques.

FIG. 7 illustrates a plot of the sum data rates with respect to different maximum interference power for both resource allocation techniques. For all different interference power levels, the proposed probability-based resource allocation techniques discussed above also achieve better throughput performance.

The use of soft information from cooperative spectrum sensing to assist the resource allocation in CR systems is proposed. A multiuser multichannel environment is considered and studies of an optimal resource allocation technique to maximize the weighted sum rate of CR users accessing licensed bands are presented. Different from conventional resource allocation techniques, the resource allocation techniques discussed above use a probability-based approach for efficient spectrum usage, which also ensures the protection of PUs from unacceptable interference and supports diverse QoS constraints for different CR users. Furthermore, a distributed implementation of the resource allocation techniques discussed above is provided.

Although the embodiments and their advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for centralized resource allocation, the method comprising:
coordinating spectrum sensing information with a set of cognitive radio (CR) user pairs;
computing probability-based information for each CR user pair in the set of CR user pairs, the computing being based on the spectrum sensing information;
computing adjustment values for each channel available for allocation;
assigning a CR user pair to an unassigned channel in a set of channels available for allocation, the assigning based on the probability-based information;
updating the adjustment values;
repeating the assigning a CR user pair and the updating the adjustment values if the adjustment values have not converged; and
transmitting a message to the set of CR user pairs, wherein the message comprises information regarding CR user pair to channel assignments.

2. The method of claim 1, wherein the adjustment values are Lagrange multipliers.

3. The method of claim 1, wherein coordinating spectrum sensing information comprises receiving spectrum sensing information at a centralized controller.

4. The method of claim 3, wherein the centralized controller is a CR user in the set of CR user pairs.

5. The method of claim 1, wherein computing probability-based information comprises computing conditional probabilities based on the spectrum sensing information.

6. The method of claim 5, wherein computing conditional probabilities comprises:
computing a first conditional probability that a licensed signal is present in a channel n at a k-th CR transmitter, where n is an integer value and ranges between one to a number of channels available for allocation, and k is an integer value and represents a CR user pair in the set of CR user pairs; and
computing a second conditional probability that the licensed signal is absent in the channel n at a k-th CR receiver.

7. The method of claim 6, wherein the conditional probability and the second conditional probability are computed for each possible channel at each CR user pair.

8. The method of claim 6, wherein computing a first conditional probability that a licensed signal is present in a channel n at a k-th CR transmitter comprises evaluating $$q_{k,n}^{(B)} = P(H_{n,1} \mid \Omega_{T_k,n})$$
$$= \frac{P(\Omega_{T_k,n} \mid H_{n,1}) * P(H_{n,1})}{P(\Omega_{T_k,n} \mid H_{n,1}) * P(H_{n,1}) + P(\Omega_{T_k,n} \mid H_{n,0}) * P(H_{n,0})},$$

where $\Omega_{T_k,n}$ denotes a set of sensing information about the n-th channel sensed by the k-th CR transmitter, and $H_{n,0}$ and $H_{n,1}$ denote hypotheses corresponding to the absence and presence of the licensed signal in the n-th channel, respectively.

9. The method of claim 6, wherein computing a second conditional probability that the licensed signal is absent in the channel n at a k-th CR receiver comprises evaluating $$q_{k,n}^{(I)} = P(H_{n,0} \mid \Omega_{R_k,n})$$
$$= \frac{P(\Omega_{R_k,n} \mid H_{n,0}) * P(H_{n,0})}{P(\Omega_{R_k,n} \mid H_{n,1}) * P(H_{n,1}) + P(\Omega_{R_k,n} \mid H_{n,0}) * P(H_{n,0})},$$

where $\Omega_{R_k,n}$ denotes a set of sensing information about the n-th channel collected by the k-th CR receiver, and $H_{n,0}$ and $H_{n,1}$ denote hypotheses corresponding to the absence and presence of the licensed signal in the n-th channel, respectively.

10. The method of claim 1, wherein assigning a CR user pair comprises:
computing a utility value and a power allocation for each CR user pair, wherein the utility values and the power allocations are based on the probability-based information;
selecting a CR user pair having a largest utility value for the unassigned channel; and
assigning the selected CR user pair to the unassigned channel.

11. The method of claim 10, wherein computing a utility value and a power allocation comprises:
computing the utility value comprises evaluating $$u_{k,n} = (w_k + \lambda_{4,k})r_{k,n} - (\lambda_{2,k}\lambda_{3,n}q_{k,n}^{(B)}g'_{k,n})p_{k,n}$$

for each channel n at a k-th CR user pair; and
computing the power allocation comprises evaluating $$p_{k,n} = \left[\frac{(w_k + \lambda_{4,k})q_{k,n}^{(I)}B}{(\lambda_{2,k} + \lambda_{3,n}q_{k,n}^{(B)}g'_{k,n})\ln 2} - \frac{N_0 B}{g_{k,n}}\right]^+$$

for each channel n at a k-th CR user pair,
where $\lambda_{2,k}$, $\lambda_{3,n}$, and $\lambda_{4,k}$ are Lagrange multipliers for the channel n at the k-th CR user pair, $w_k$ is a weighting factor for a data rate of the k-th CR user pair, $N_0$ is a noise floor level, B is a bandwidth of a channel n, $q_{k,n}^{(I)}$ is a probability that the licensed signal is absent in a channel n at a k-th CR receiver, $q_{k,n}^{(B)}$ is a probability that a licensed signal is present in a channel n at a k-th CR transmitter, and $g_{k,n}$ is the channel gain from the transmitter to the receiver over channel n at the k-th CR user pair.

12. The method of claim 1, wherein updating the multipliers comprises evaluating $$\lambda_{2,k}^{(i+1)} = \left[\lambda_{2,k}^{(i)} - s_2^{(i)}\left(\hat{P}_k - \sum_{n=1}^{N} p_{k,n}\right)\right]^+,$$

$$\lambda_{3,n}^{(i+1)} = \left[\lambda_{3,n}^{(i)} - s_3^{(i)}\left(\hat{I}_n - \sum_{k=1}^{K} q_{k,n}^{(B)}g'_{k,n}p_{k,n}\right)\right]^+, \text{ and}$$

$$\lambda_{4,k}^{(i+1)} = \left[\lambda_{4,k}^{(i)} - s_4^{(i)}\left(\sum_{n=1}^{N} \rho_{k,n}r_{k,n} - \check{R}_k\right)\right]^+,$$

where $\lambda_{2,k}^{(i)}$, $\lambda_{3,n}^{(i)}$, and $\lambda_{4,k}^{(i)}$ are small positive step sizes, $\hat{P}_k$ is a maximum transmit power for the k-th CR user pair over all the channels, $\hat{I}_n$ is a maximum allowable interference power for a licensed system in the n-th channel, $\check{R}_k$ is a minimum QoS requirement of the k-th CR user pair, $\rho_{k,n}$ is an allocation indicator that equals 1 when the n-th channel is allocated to the k-th CR user pair and 0 otherwise, $q_{k,n}^{(B)}$ is a probability that a licensed signal is present in a channel n at a k-th CR transmitter, $p_{k,n}$ is a transmit power for the k-th CR user pair in the n-th channel, and $g'_{k,n}$ is the path loss from the k-th CR transmitter to a licensed receiver in the n-th channel.

13. A method for resource allocation at a cognitive radio (CR) user, the method comprising:
coordinating spectrum sensing information with a set of CR user pairs;
computing probability-based information based on the spectrum sensing information;
computing adjustment values for each channel available for allocation;
computing a utility value and a power allocation for each CR user pair based on the probability-based information;
sharing the utility values with other CR user pairs in the set of CR user pairs;
for each channel I, where I ranges from 1 to a number of channels available for allocation,
setting a transmit power for channel I to a first value and updating adjustment values if a utility value associated with the channel I for the CR user is a maximum utility value, and
setting the transmit power for channel I to a second value if the utility value associated with the channel I for the CR user is not the maximum utility value;
updating the adjustment values;
repeating the computing a utility value and a power allocation, the sharing the utility values with other CR user pairs, the for each channel I, and the updating the adjustment values if the adjustment values have not converged; and
transmitting over channels allocated to the CR user.

14. The method of claim 13, wherein the adjustment values have not converged if one or more adjustment value changes by more than a threshold or if a number of times the adjustment values have been updated is less than a specified number.

15. The method of claim 13, wherein the adjustment values are Lagrange multipliers, and wherein updating the adjustment values comprises:
updating Lagrange multiplier $\lambda_{3,n}^{(i)}$ for each CR user pair; and
updating Lagrange multiplier $\lambda_{2,k}^{(i)}$ and $\lambda_{4,k}^{(i)}$ for each channel where k is an integer value and ranges from one to a number of CR user pairs in the set of CR user pairs.

16. The method of claim 15, wherein updating Lagrange multiplier $\lambda_{3,n}^{(i)}$ comprises evaluating $$\lambda_{3,n}^{(i+1)} = \left[\lambda_{3,n}^{(i)} - s_3^{(i)}\left(\hat{I}_n - \sum_{k=1}^{K} q_{k,n}^{(B)} g'_{k,n} p_{k,n}\right)\right]^+$$

and updating Lagrange multipliers $\lambda_{2,k}^{(i)}$ and $\lambda_{4,k}^{(i)}$ comprises evaluating $$\lambda_{2,k}^{(i+1)} = \left[\lambda_{2,k}^{(i)} - s_2^{(i)}\left(\hat{P}_k - \sum_{n=1}^{N} p_{k,n}\right)\right]^+$$

and $$\lambda_{4,k}^{(i+1)} = \left[\lambda_{4,k}^{(i)} - s_4^{(i)}\left(\sum_{n=1}^{N} \rho_{k,n} r_{k,n} - \check{R}_k\right)\right]^+,$$

where $\lambda_{2,k}^{(i)}$, $\lambda_{3,n}^{(i)}$, and $\lambda_{4,k}^{(i)}$ are small positive step sizes, $\hat{P}_k$ is a maximum transmit power for the k-th CR user pair over all the channels, $\hat{I}_n$ is a maximum allowable interference power for a licensed system in the n-th channel, $\check{R}_k$ is a minimum QoS requirement of the k-th CR user pair, $\rho_{k,n}$ is an allocation indicator that equals 1 when the n-th channel is allocated to the k-th CR user pair and 0 otherwise, $q_{k,n}^{(B)}$ is a probability that a licensed signal is present in a channel n at a k-th CR transmitter, $p_{k,n}$ is a transmit power for the k-th CR user pair in the n-th channel, and $g'_{k,n}$ is the path loss from the k-th CR transmitter to a licensed receiver in the n-th channel.

17. The method of claim 13, wherein the first value is a one and the second value is a zero.

18. The method of claim 13, wherein sharing the utility values comprises:
transmitting the utility values to other CR user pairs in the set of CR user pairs; and
receiving shared utility values from each of the CR user pairs in the set of CR user pairs.

19. A communications device comprising:
a receiver coupled to an antenna, the receiver configured to receive signals detected by the antenna;
a transmitter coupled to the antenna, the transmitter configured to transmit signals using the antenna; and
a processor coupled to the receiver and to the transmitter, the processor configured to sense a state of a spectrum band over which signals are transmitted and received, to combine spectrum band state received from neighboring communications devices, to compute conditional probabilities based on the spectrum band state, to compute and update multipliers for each channel available for allocation, to select communications device pairs based on a computed power allocation and a utility, and to assign resources to selected communications device pairs.

20. The communications device of claim 19, wherein the processor comprises:
a spectrum sensing unit configured to sense a state of the spectrum band;
a combining unit coupled to the spectrum sensing unit, the combining unit configured to combine the state of the spectrum band and spectrum band states received from the neighboring communications devices;
a probability compute unit coupled to the spectrum sensing unit, the probability compute unit configured to the compute conditional probabilities based on the spectrum band state;
a multiplier compute unit coupled to the spectrum sensing unit, the multiplier compute unit configured to compute and update multipliers for each channel available for allocation; and
an optimization unit coupled to the spectrum sensing unit, the optimization unit configured to select communications device pairs based on a computed power allocation and a utility, and to assign resources to selected communications device pairs.

21. The communications device of claim 20, wherein the processor further comprises:
a utility compute unit coupled to the spectrum sensing unit, the utility compute unit configured to compute a utility value for each channel for each communications device pair; and
an interference compute unit coupled to the spectrum sensing unit, the interference compute unit configured to compute interference caused to a primary user by transmissions made by each communications device pair.

22. The communications device of claim 20, wherein the processor further comprises:
a power allocation compute unit coupled to the spectrum sensing unit, the power allocation compute unit configured to compute a power allocation for each communications device pair; and
an effective rate compute unit coupled to the spectrum sensing unit, the effective rate compute unit configured to compute an effective rate for a receiver in each communications device pair.

* * * * *